(12) United States Patent
Bartelt (10) Patent No.: US 12,184,627 B2
(45) Date of Patent: Dec. 31, 2024

(54) NETWORK DEVICE CONFIGURED FOR CRYPTOGRAPHICALLY PROTECTED COMMUNICATION SUPPORTING MULTIPLE EXECUTION ENVIRONMENTS

(71) Applicant: Robert Bosch GmbH, Stuttgart (DE)

(72) Inventor: Andreas Bartelt, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 205 days.

(21) Appl. No.: 18/064,600

(22) Filed: Dec. 12, 2022

(65) Prior Publication Data
US 2024/0195791 A1 Jun. 13, 2024

(30) Foreign Application Priority Data
Apr. 14, 2022 (DE) .................. 10 2022 203 797

(51) Int. Cl.
*H04L 9/40* (2022.01)

(52) U.S. Cl.
CPC .............. *H04L 63/0485* (2013.01)

(58) Field of Classification Search
CPC .................................. H04L 63/0485
See application file for complete search history.

(56) References Cited

U.S. PATENT DOCUMENTS

| | | | |
|---|---|---|---|
| 8,549,282 B2 * | 10/2013 | Sabo | H04L 9/0825 713/160 |
| 11,805,109 B1 * | 10/2023 | Khare | H04L 63/0485 |
| 2010/0306816 A1 * | 12/2010 | McGrew et al. | H04L 63/08 726/1 |

* cited by examiner

*Primary Examiner* — Simon P Kanaan
(74) *Attorney, Agent, or Firm* — NORTON ROSE FULBRIGHT US LLP; Gerard A. Messina (57) ABSTRACT

A first network device configured for cryptographically protected communication with a second network device. The cryptographically protected communication comprising at least a handshake protocol, a cryptographic protection of bulk data protocol, and a resumption protocol. A session handling system obtains from the handshake protocol a first bulk cryptographic protection key and a resumption key. The first cryptographic protection key is forwarded to the host system but not the resumption key.

19 Claims, 3 Drawing Sheets

NETWORK DEVICE CONFIGURED FOR CRYPTOGRAPHICALLY PROTECTED COMMUNICATION SUPPORTING MULTIPLE EXECUTION ENVIRONMENTS

CROSS REFERENCE

The present application claims the benefit under 35 U.S.C. § 119 of German Patent Application No. DE 10 2022 203 797.9 filed on Apr. 14, 2022, which is expressly incorporated herein by reference in its entirety.

FIELD

The present invention relates to first network device configured for cryptographically protected communication with a second network device, a method for cryptographically protected communication between a first network device and a second network device, a computer readable medium.

BACKGROUND INFORMATION

Protected communication between two computerized devices is common on computer networks, such as the Internet. For example, protecting data may be done by encrypting the data, authenticating the data, or both. A well-known system for protecting communication in a computer network is TLS, or DTLS.

We refer to the initial TLS or DTLS handshake between two endpoints as a full handshake which makes use of long-term secret keys for establishing endpoint authentication, e.g., authentication of the server endpoint, or, alternatively, mutual authentication of client and server endpoints. Multiple variants for such endpoint authentication via long-term secret keys have been IETF-standardized; For example, asymmetric private keys which correspond to the public keys from X509v3 certificates, asymmetric private keys which correspond to so-called raw public keys, or a symmetric pre-shared secret key which previously has been distributed to both endpoints via some out-of-band means. During a full handshake, an authenticated key establishment method is used in order to cryptographically derive ephemeral key material, e.g., short-term keys, which may then be the basis for deriving keys for bulk encryption as well as for so-called resumption mechanisms which enable abbreviated handshakes for future TLS or DTLS connections between the same endpoints.

Abbreviated handshakes enable performance-related savings, e.g., reduced network latency overhead due to fewer required handshake messages as well as lower computational overhead with regard to cryptography.

Multiple version-specific resumption mechanisms have been IETF-standardized for the TLS, RFC5246, RFC8446, and DTLS, RFC6347 protocols. For example, session resumption via session IDs from RFC 5246 is used in versions <=1.2, session tickets from RFC5077 used in versions <=1.2 and resumption from RFC8446 via pre-shared key as specified for version 1.3. The cited RFCs being included herein by reference.

The conventional resumption variants effectively make use of an ephemeral resumption key which then effectively substitutes for the explicit endpoint authentication via long-term secret keys from the initial full handshake. The term resumption key is used herein, since the TLS RFCs do not provide a consistent naming in this regard. A resumption key is a short-term key since they are associated with a configurable lifetime which typically will not exceed 24 hours. In the specific case of TLS 1.3, this lifetime also has a hard upper limit of at most 7 days. An abbreviated resumption handshake is only implicitly endpoint authenticated due to its cryptographic binding to the authenticated key establishment method from the initial full handshake.

A typically encountered problem, e.g., on IoT devices, is that ephemeral keys in the scope of resumption are effectively much less protected from attackers than the long-term secret keys for endpoint authentication. An attacker who gains access to a resumption key would be able to resume the corresponding TLS (or DTLS) session without actually requiring any access to the long-term secret keys which would be required for explicit endpoint authentication during the initial full handshake. With a leaked resumption key in possession, the corresponding TLS (or DTLS) session could potentially even be resumed multiple times and from different endpoints. This would typically violate the security goals of the system.

Moreover, specifically on server-side TLS (or DTLS) endpoints, the session ticket-based resumption variants make use of a so-called Session Ticket Encryption Key (STEK) which is typically also exposed to the Host System like all the other ephemeral key material. An attacker who obtains knowledge of the STEK by some means, such as exploiting an information leakage vulnerability on the Host System, would effectively be able to decrypt the resumption key material which is contained in (STEK-encrypted) session tickets, and these could be collected from previously recorded TLS (or DTLS) sessions. In addition to enabling the attacker to resume the corresponding sessions, for TLS versions <1.3, this kind of attack also enables decryption of the corresponding bulk traffic which effectively negates the security benefits of forward secrecy. It is important to note that this kind of attack effectively facilitates large scale surveillance.

SUMMARY

It would be advantageous to have improved communication between a first network device and a second network device.

In an example embodiment of the present invention, an improved protection of ephemeral key material at runtime is provided. For example, the only ephemeral key material which in an embodiment might be exposed directly to a Host System of the network device are the symmetric keys which are used in the specific scope of bulk protection, e.g., encryption, etc.; for example, an embodiment may expose the cryptographically derived key_block of a TLS protocol to the host system. Even if an attacker gains access to these keys, then he/she will only be able to decrypt or manipulate the respective TLS (or DTLS) connection. However, the attacker will effectively be hindered from stealing the resumption key and other ephemeral key material, e.g., as used for resumption.

For example, a first network device may be configured for cryptographically protected communication with a second network device. The cryptographically protected communication comprises at least a handshake protocol, a cryptographic protection of bulk data protocol, and a resumption protocol. For example, the first and second network device may be configured for a TLS or DTLS protocol.

Interestingly, the first network device is configured to arrange multiple separate execution environments in the first network device, including a host system and a session handling system. The protocols involved in the cryptographic communication are split across at least these two execution environments.

The session handling system may be configured to obtain a cryptographic response depending on the long-term secret, and to establish a secure session between the first network device and the second network device. A key or keys obtained in this way for cryptographic protection of bulk data is forwarded to the host system, but other ephemeral key material, in particular, resumption keys, are not.

Cryptographic protection of bulk data can now be performed by the host system, but an attack on the host system does not result in a leak of the other ephemeral key material. Moreover, the long-term secret keys are further removed from the host system; in an embodiment, the long term secret keys are stored in a security system that is not accessible to the host system, while the session handler only has access through an interface, e.g., a predefined API.

In use, typically most of the activity is done in the host system. The host system may also be the execution environment where a user application runs. A potential attack on the first network device is therefore more likely on the host system; the host system having a larger attack surface and/or having more external network connections. In fact, in an embodiment, the session handling system need not have any connection to external computers; for example, because any communication needed, say, for establishing a cryptographic channel is forwarded by the host system.

Key material that is not needed for providing bulk protection services, e.g., to a user application running in the host system, is not exposed to the host system. Interestingly, the first network is capable of resumption, and thus of engaging in cryptographic communication with little delay, as the session handling system has access to the ephemeral keys used for it.

In an example embodiment of the present invention, the first network device comprises a security system, the security system being configured to store a long-term secret, the session handling system is configured to obtain the cryptographic response from the security system. Preferably, the security system is a hardware shielded module, e.g., a secure module, a secure crypto processor, a so-called Trusted Platform Module (TPM), a dedicated microcontroller, etc., configured to store and shield cryptographic keys.

In an example embodiment of the present invention, neither the host system execution environment nor the session handling system execution environment have access to the long-term secret, and the host system execution environment does not have access to the resumption key.

A further aspect of the present invention is a communication method. An example embodiment of the method of the present invention may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an example embodiment of the present invention, the computer program comprises computer program code adapted to perform all or part of the steps of an embodiment of the method when the computer program is run on a computer. Preferably, the computer program is embodied on a computer readable medium.

BRIEF DESCRIPTION OF DRAWINGS

Further details, aspects, and embodiments will be described, by way of example only, with reference to the figures. Elements in the figures are illustrated for simplicity and clarity and have not necessarily been drawn to scale. In the figures, elements which correspond to elements already described may have the same reference numerals.

REFERENCE SIGNS LIST

The following list of references and abbreviations corresponds to FIGS. 1A-2, 4A and 4B, and is provided for facilitating the interpretation of the figures and shall not be construed as limiting the present invention.

100, 101 a communication system
110 a first network device
130 a processor system
140 storage
150 communication interface
160, 160.1, 160.2 a second network device
170 a processor system
180 a storage
190 a communication interface
172 a computer network
200 a first network device
211 cryptographically protected communication
210 a host system
220 a session handling system
230 a security system,
231 a cryptographic interface
221 a first communication channel
222 a second communication channel
1000 a computer readable medium
1010 a writable part
1020 a computer program
1110 integrated circuit (s)
1120 a processing unit
1122 a memory
1124 a dedicated integrated circuit 1126 a communication element
1130 an interconnect
1140 a processor system

DETAILED DESCRIPTION OF EXAMPLE EMBODIMENTS

While the present invention is susceptible of embodiment in many different forms, there are shown in the figures and will herein be described in detail one or more specific embodiments, with the understanding that the present disclosure is to be considered as exemplary of the principles of the present invention and not intended to limit it to the specific embodiments shown and described.

In the following, for the sake of understanding, elements of embodiments are described in operation. However, it will be apparent that the respective elements are arranged to perform the functions being described as performed by them. Further, the subject matter that is presently disclosed is not limited to the embodiments only, but also includes every other combination of features described herein.

Conventionally, network devices, such as IoT devices, desktop devices, servers, and so on, make use of the TLS (or DTLS) protocol in order to enable a cryptographically protected end-to-end secure tunnel between TCP-enabled (or UDP-enabled) software which runs on the device and the corresponding services which run at the backend of the device. Cryptographically protected data is used in digital communication of all kinds, e.g., to send or receive digital data, e.g., sensor data, computer instructions, media, and so on.

In many TLS (or DTLS) deployments, the ephemeral key material, e.g., in particular key material for resumption, is much less protected than the long-term secret keys. For convenience, key material is equated with a key derived from it.

For example, asymmetric long-term secret keys are typically protected inside a dedicated Security system which is specifically designed for protecting this kind of secret key material from being leaked "at rest" when the device is powered off, as well as "at runtime". These kinds of security systems are typically provided off-the-self in the form of a Hardware Security Module (HSM), a Trusted Platform Module (TPM), a PKCS#11 based security system, or other kinds of specialized crypto subsystems. These subsystems typically only expose APIs for generic crypto schemes (e.g., APIs for creating ECDSA signatures, RSA based encryption and signatures, etc.). However, such security systems do not provide APIs specifically tailored for the TLS (or DTLS) handshake which would be required in order be able to keep ephemeral key material inside the Security system, e.g., the so-called Master Secret which also corresponds to the resumption key in TLS versions <1.3, etc. In the following, we will continue to use security system as an umbrella term for these kinds of specialized, off-the-shelf crypto subsystems. The security system typically is part of a network device.

The actual encryption and authentication of bulk traffic is often conducted directly on the Host System. This approach has the benefit of saving latency since bulk data does not have to be looped through the Security system. Conventionally, ephemeral key material in the scope of resumption is thus typically exposed directly to the Host System where protection from being leaked is much weaker than for the long-term keys inside the Security system.

Embodiments described herein can be applied with all current TLS and DTLS protocol versions, e.g., as IETF-standardized. For example, in an embodiment additional subsystem, the session handling system, is integrated between the Host System and the Security system. This session handling system can be chosen to provide more robust protection guarantees at runtime than the Host System; for example, the session handling system may have a more robust separation provided by a type-1 hypervisor or some Trusted Execution Environment variant. For example, the session handling system may be configured to run the TLS (or DTLS) handshake, alert, and change_cipher_spec subprotocols, and to keep ephemeral key material (e.g., resumption keys, the STEK in case of server-side endpoints, etc.) protected. The derived keys for bulk protection, e.g., bulk encryption (e.g., key_block) are provided to the Host System which handles all bulk encryption (e.g., application_data records in the scope of the TLS (or DTLS) protocol).

TLS, RFC5246, RFC8446 and DTLS, RFC6347 are the IETF-standardized cryptographic protocols which are widely used in order to provide a cryptographically protected end-to-end secure tunnel between software on IoT devices and services at the IoT backend; these are included herein by reference. The TLS handshake also has been applied to the more recent QUIC protocol RFC9001, included herein by reference.

The IETF-standardized mechanisms for resumption RFC5246, RFC8446, RFC5077 enable performance related benefits such as reduced network latency overhead and lower computational overhead with regard to cryptography; these are included herein by reference. However, without adequate runtime protection of ephemeral key material in this scope (e.g., resumption keys, the STEK in case of server-side TLS/DTLS endpoints, etc.), all these resumption methods have potentially serious drawbacks with regard to security. The method detailed herein reduces the risk that ephemeral key material is being leaked from the device by an attacker. Embodiment can be combined with existing off-the-shelf Security systems, in particular those that do not provide TLS (or DTLS) specific APIs. The method can be applied to client-side as well as server-side TLS (or DTLS) endpoints. Moreover, integration with the Security system for endpoint authentication during the full handshake works for client-side as well as server-side endpoint authentication, depending on the session-specific requirements and the specific use case.

The IETF-standardized TLS and DTLS versions allow for various endpoint authentication and key exchange methods, and some of them are also bound to specific protocol versions. The cryptographic schemes and conventions for deriving ephemeral key material, e.g., the key which is actually used in resumption mechanisms, may also be quite heterogenous.

For example, operations in scope of application_data records may be handled by the Host System, e.g., the handling of bulk encryption, while other subprotocols, e.g., handshake, alert, and change_cipher_spec, are delegated to the session handling system. The session handling system may have control, even exclusive control, of all ephemeral key material, e.g., including resumption keys, the STEK in case of server-side TLS/DTLS endpoints, etc. Transitions between application_data and the other record types may be handled by an explicit handover of state and control between the Host System and the TLS/DTLS Session Handling System.

Figure 1A:
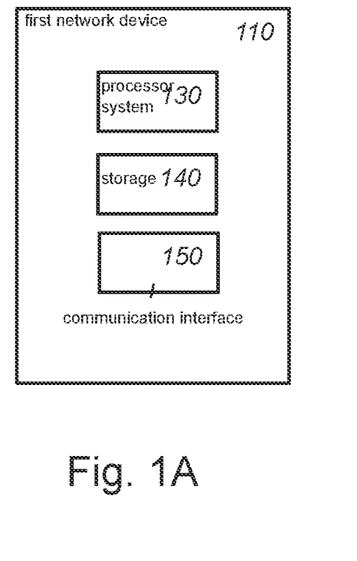
FIG. 1A schematically shows an example of an embodiment of a first network device configured for cryptographically protected communication, according to the present invention.
Figure 1B:
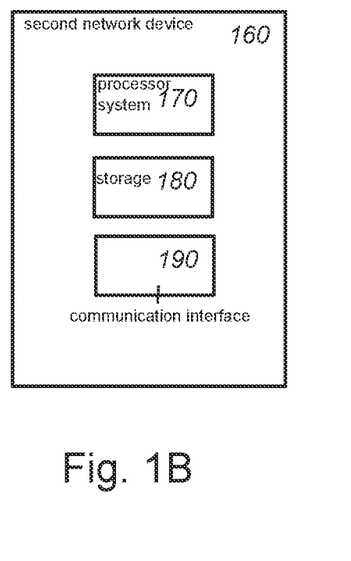
FIG. 1B schematically shows an example of an embodiment of a second network device, according to the present invention.

FIG. 1a schematically shows an example of an embodiment of a first network device 110. FIG. 1b schematically shows an example of an embodiment of a second network device 160. First network device 110 and second network device 160 may be part of a communication system 100.

First network device 110 is configured to send and/or receive cryptographically protected communication from/to the second network device 160.

The second network device 160 is likewise configured to receive and/or send the cryptographically protected communication to/from the first network device 110. The relationship between the first and second network devices need not be one-to-one. For example, the first network device 110 may be configured to engage in cryptographically protected communication with multiple second network devices, or with a single second network device. The first network device 110 may be configured as a server device, or as a client device. The second network device may be a device according to an embodiment, e.g., like the first network device is, but this is not necessary. The second network device may be conventional.

The cryptographically protected communication comprises different protocols including at least a handshake protocol, a cryptographic protection of bulk data protocol, and a resumption protocol. These protocols are further explained herein. Embodiments may follow one of several standards referred to herein to implement these protocols; However, embodiments are also possible that do not follow those standards.

For example, the communication system 100 may be used to protect other communication needs, e.g., secure messaging, e-mails, banking, cloud computing, and so on.

First network device 110 may comprise a processor system 130, a storage 140, and a communication interface 150. Second network device 160 may comprise a processor system 170, a storage 180, and a communication interface 190. Storage 140 and 180 may be, e.g., electronic storage, magnetic storage, etc. The storage may comprise local storage, e.g., a local hard drive or electronic memory. Storage 140 and 180 may comprise non-local storage, e.g., cloud storage. In the latter case, storage 140 and 180 may comprise a storage interface to the non-local storage. Storage may comprise multiple discrete sub-storages together making up storage 140, 180. Storage may comprise a volatile writable part, say a RAM, a non-volatile writable part, e.g., Flash, a non-volatile non-writable part, e.g., ROM.

Storage 140 and 180 may be non-transitory storage. For example, storage 140 and 180 may store data in the presence of power such as a volatile memory device, e.g., a Random Access Memory (RAM). For example, storage 140 and 180 may store data in the presence of power as well as outside the presence of power such as a non-volatile memory device, e.g., Flash memory.

The devices 110 and 160 may communicate internally, with each other, with other devices, external storage, input devices, output devices, and/or one or more sensors over a computer network. The computer network may be an internet, an intranet, a LAN, a WLAN, etc. The computer network may be the Internet. The devices 110 and 160 comprise a connection interface which is arranged to communicate within communication system 100 or outside of communication system 100 as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

The communication interface 150 may be used to send or receive digital data, e.g., the communication, in particular cryptographically protected communication. The communication interface 190 may be used to send or receive digital data, e.g., the communication, in particular cryptographically protected communication.

The execution of devices 110 and 160 may be implemented in a processor system. The devices 110 and 160 may comprise functional units to implement aspects of embodiments. The functional units may be part of the processor system. For example, functional units shown herein may be wholly or partially implemented in computer instructions that are stored in a storage of the device and executable by the processor system.

The processor system may comprise one or more processor circuits, e.g., microprocessors, CPUs, GPUs, etc. Devices 110 and 160 may comprise multiple processors. A processor circuit may be implemented in a distributed fashion, e.g., as multiple sub-processor circuits. For example, devices 110 and 160 may use cloud computing.

Typically, the first network device 110 and second network device 160 each comprise a microprocessor which executes appropriate software stored at the device; for example, that software may have been downloaded and/or stored in a corresponding memory, e.g., a volatile memory such as RAM or a non-volatile memory such as Flash.

Instead of using software to implement a function, the devices 110 and/or 160 may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, first network device 110 and second network device 160 may comprise circuits, e.g., for cryptographic processing, and/or arithmetic processing.

The first network device 110 and/or the second network device 160 may comprise a security system. The security system is configured to store a long-term secret. For example, the security system may comprise a trusted platform module (TPM), e.g., according to ISO/IEC 11889, a secure crypto processor, a dedicated microcontroller designed to securely store and/or isolate one or more cryptographic keys. The security system may comprise a hypervisor to create and/or enforce the separate execution environment. The security system is preferably supported by a secure hardware, but could also be created in software. For example, a kernel running on the device may implement the security system. A security system, especially having hardware based security is preferable, but not necessary, in a pinch the session handler may handle the storage, protection and processing of long term keys. Although the latter is not a preferable arrangement, it is still better than one in which the host system were to handle the long term secrets.

These kinds of security systems are typically provided off-the-self in the form of a Hardware Security Module (HSM), a Trusted Platform Module (TPM), a PKCS#11 based security system, or other kinds of specialized crypto subsystems. These subsystems typically only expose APIs for generic crypto schemes (e.g., APIs for creating ECDSA signatures, RSA based encryption and signatures, etc.).

The first network device 110 and/or the second network device 160 may be configured to arrange multiple separate execution environments. For example, the device may comprise an execution environment mechanism. For example, the device may comprise an OS kernel, and/or a hypervisor, etc., to create and/or enforce separate execution environment.

In hybrid embodiments, functional units are implemented partially in hardware, e.g., as coprocessors, e.g., cryptographic coprocessors, and partially in software stored and executed on the device.

Figure 1C:
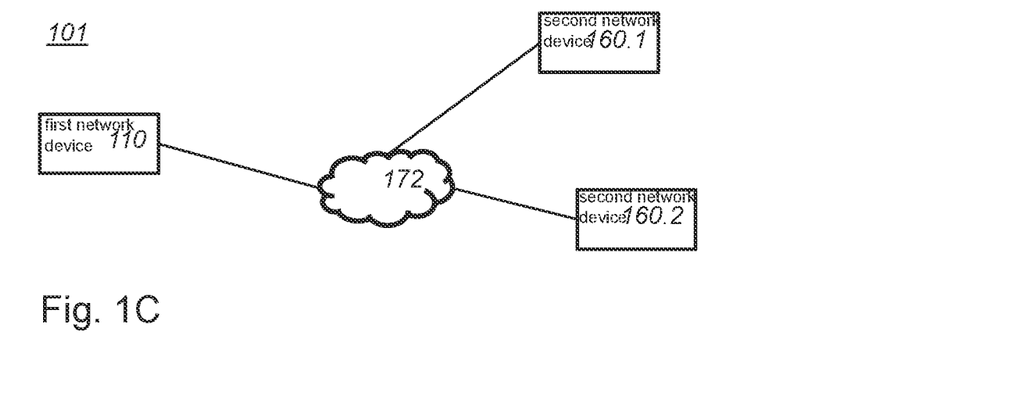
FIG. 1C schematically shows an example of an embodiment of a communication system, according to the present invention.

FIG. 1c schematically shows an example of an embodiment of communication system 101. Communication system 101 may comprise multiple second network devices; shown are second network device 160.1 and 160.2. Communication system 100 may comprise multiple first network devices; one first network device 110 is shown. The devices are connected through a computer network 172, e.g., the Internet. The client and server device may be according to an embodiment.

Figure 2:
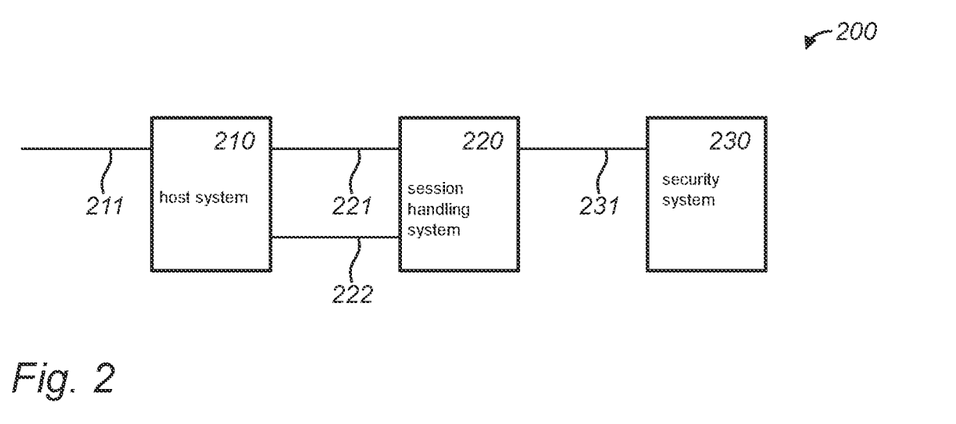
FIG. 2 schematically shows an example of an embodiment of a first network device configured for cryptographically protected communication, according to the present invention.

FIG. 2 schematically shows an example of an embodiment of a first network device configured for cryptographically protected communication. First network device 200 is configured for cryptographically protected communication 211 with a second network device. The second network device is not shown in FIG. 2. The first and second network device, and possibly further first and/or second network devices may be part of a communication system for exchanging cryptographically protected data.

In an embodiment, first network device 200 is compatible with existing standards, so that the second network device may be a conventional network device. This is not necessary; the second network device may be according to an embodiment. The latter is advantageous, as data exchanged over a network is more secure if both endpoints are more secure. The second digital network could also or instead have a higher security through conventional means though.

FIG. 2 shows cryptographically protected communication 211 with the second network device. The cryptographically protected communication 211 comprises at least three parts: a handshake protocol, a cryptographic protection of bulk data protocol, and a resumption protocol. The handshake protocol establishes ephemeral keys for cryptographic protections and arranges a means to resume the communication if needed without having execute a full iteration of the handshake protocol. The latter is used in a later resumption protocol. As the handshake protocol takes times and delays the communication this advantageous. Removing or reducing the handshake protocol reduces latency.

For example, first network device 200 and/or the second network device may run a cryptographic application that includes communicating with each other. By protecting the communicating between the first and second device, the application's security is increased.

Embodiments may be usefully employed at the server side. For example, in an embodiment, the first network device 200 may be a server device or an IoT backend device.

Embodiments may be usefully employed at the consumer side. For example, in an embodiment, the first network device 200 may be a consumer device or an IoT client.

Security System 230

First network device 200 is configured with a security system 230. The security system 230 is configured to store a long-term secret. Typically, the security system 230 comprises hardware based security to protect the long-term secret. The security system may be configured to shield the long-term secret from the rest of first network device 200. For example, the long-term secret may comprise the private key of an asymmetric key-pair, e.g., a public-private key pair. For example, the long-term secret may comprise a private RSA key, a private ECDSA key. The public key corresponding to the private key may be shared with the second network device. For example, the long-term secret may comprise a symmetric key, which is shared, e.g., through an out-of-bound channel with the second network device. The long-term secret enables generating a shared ephemeral secret with another device. Access to the long-term secret generally enables the ability to read all communication, and/or, create authenticity tokens. Leakage of the long-term secret should therefore be avoided.

The security system is configured so that the rest of device 200, outside of security system 230, does not have direct access the long term secret. To still allow use of the long-term secret, security system 230 exports a cryptographic interface 231 that allows some operations to be performed with the long-term secret. The security system may be a hardware based module storing one or more long-term secrets accessible only through a cryptographic interface. For example, interface 231 may comprise an operation for decrypting data using the long-term secret. For example, interface 231 may comprise an operation for computing an authentication token for data using the long-term secret, e.g., a signature or a message authentication code. The security system may store multiple long-term secrets. Security system is preferred but optional.

It is preferred for higher security that the security system is hardware based, but this is not necessary. For example, the security system may be an execution environment like, the session handler, as described herein.

Execution Environments

First network device 200 is configured to arrange multiple separate execution environments in first network device 200. The multiple separate execution environments including a host system 210 and a session handling system 220.

For example, in an embodiment using (D) TLS, the host system may be considered as a (D) TLS frontend. For example, the (D) TLS frontend may be loaded in an execution environment as part of the original application process using (D) TLS, e.g., by importing a library. The host system, e.g., the (D) TLS frontend handles application_data records. The session handling system may be considered as a (D) TLS backend. For example, one or more dedicated daemons may run in a separated process context for this purpose. The frontend and backend may only be connected via dedicated channels, e.g., via session and control channels. The session system, e.g., the (D) TLS backend handles the other sub-protocols of (D) TLS.

An execution environment does not have access to data and/or software in another execution environment in the first network device 200, nor to data and/or software in the security system 230. In particular, neither the host system 210 execution environment nor the session handling system 220 execution environment have access to the long-term secret stored in security system 230. Although, two execution environments do not have direct read or write access to each other's code, they could be configured with an interface to send and/or receive data.

Access to interface 231 is typically restricted to parts of system 200. For example, device 200 may be configured so that only session handler 220 has access to interface 231.

In an embodiment, the host system runs a cryptographic application to cryptographically protect data using the bulk cryptographic protection key, the cryptographic application being configured to protect data sent to and/or received from the second network device with a bulk cryptographic protection key. For example, the cryptographic operations may be separated from other application parts. For example, in an embodiment, the host system 210 runs a cryptographic application to cryptographically protect data using a bulk cryptographic protection key and runs a user application, the user application being configured to use data received from the second network device and/or to provide data to the second network device. Sending and receiving data by the user application may then be done through the cryptographic application, where said data is protected with a bulk cryptographic protection key, as discussed herein.

For example, in an embodiment, the execution environments, in particular, the host system execution environment and the session handling system execution environment are separated from each other through hardware supported execution separation, e.g., a hypervisor, e.g., a type-1 hypervisor or some Trusted Execution Environment variant.

Execution environment may be enforced using any generic separation mechanism. The separation mechanism may use a Trusted Computing Base (TCB). Separation may be enforced by the Trusted Computing Base (TCB). Trusted Computing Base (TCB), e.g., include an OS kernel's TCB, e.g., Linux or BSD kernel, which manages & separates processes, a hypervisor's TCB which separates Virtual Machines (VMs), or the TCB of a Trusted Execution Environment (TEE) (e.g., ARM TrustZone's Secure World) which separates the non-secure world from the secure world. These TCBs provide different tradeoffs with respect to separation strength, HW resource requirements, latency/throughput, etc. These TCBs may be stacked.

As discussed further herein, different execution environments can be used to support different cryptographic applications.

In particular, the host system may be used to support bulk operations, e.g., the cryptographic protection of bulk data. For example, cryptographic protection may comprise confidentiality protection, e.g., the encryption and/or decryption of data. For example, cryptographic protection may comprise integrity protection, e.g., generation and/or verification of authenticity tokens.

The session handler may be used to support operations that are not related to the protection of bulk data. For example, the session handler may support operations that comprise the use of interface 231 to the security system.

For example, in an embodiment, first network device 200 is configured according to TLS, e.g., according to RFC 8446 (included herein by reference), wherein
host system 210 is configured to process records of type application_data protocol but not operations of other type, e.g., handshake, alert, and change_cipher_spec type, and
the session handling system 220 is configured to execute operations of the other types.
Handshake Protocol The handshake protocol is handled by the session handler. During the handshake protocol, the session handling system 220 is configured to obtain a cryptographic response from security system 230 depending on the long-term secret. For example, the interface 231 may be called with a request for a specified response depending on the long-term secret. The response may be, e.g., a decryption, a signature, generation, or verification of a message authentication code. For example, the response may comprise a signature computed over a nonce, etc.

The cryptographic response is sent to the second network device as part of the handshake protocol to establish a secure session between the first network device 200 and the second network device. Session handling system 220 obtains from the handshake protocol a first bulk cryptographic key and a resumption key. The first bulk cryptographic protection key is forwarded to the host system 210. The resumption key is not forwarded to host system 210.

For example, the session handling system may obtain a key_block, which may contain one or multiple cryptographic keys. For example, the key_block may comprise different keys for client and server sides and for encryption/authentication purposes, the keys may depend on the used cipher suites. A typical example of key for bulk protection is an ephemeral session key. As discussed herein, bulk protection may refer to encryption of data sent from the first network device, to decryption of data received at the first network device, to generation and verification of authentication tokens, etc.

Two examples of establishing a key for bulk protection, e.g., of ephemeral session key material are: 1) authenticated key agreement, e.g., based on (EC) DHE and 2) key transport, e.g., from older RSA cipher suites in TLS <=1.2. See for examples, RFC 8446 section 4 (TLS 1.3), and to sections 7 & 8 in RFC 5246 (TLS 1.2), included herein by reference.

The resumption key generically refers to all other ephemeral key material which may be used resume the cryptographic communication between the first and second network device without involving the long-term secret, e.g., without executing a full handshake protocol. For example, the resumption key may comprise a TLS or DTLS premaster secret, master secret, resumption PSK, Session Ticket Encryption Key (STEK), and so on.

The session handling system 220 may be configured to obtain from the handshake protocol a master secret shared with the second network device. The master secret may be used to derive a first bulk cryptographic protection key and a resumption key. More in particular, the master secret may itself be derived from a premaster secret that is shared, e.g., negotiated, between the first and second network device. The premaster secret should also be protected. In TLS <=1.2, the master secret may be used as a resumption key. In TLS 1.3, the resumption key is a derived key, called a Pre-Shared Key.

Note that the host system 210 execution environment does not have access to the resumption key. For example, if a master key and/or premaster key is used, then the host system 210 execution environment does not have access to the master secret or premaster secret. For example, the host system 210 execution environment may only have access to ephemeral key material in the scope of protection of bulk data, such as a key_block or traffic keys.

The bulk cryptographic protection key and the resumption key are typically short-term keys. For example, these may have a validity date, e.g., a validity of at most a week, a day, or the like.

The handshake protocol may include authenticating the second network device by the session handler.
Cryptographic Protection of Bulk Data Protocol Host system 210 is configured to cryptographically protect bulk data received at the second network device or sent to the second network device.

Cryptographic protection may be confidentiality protection. For example, received data may be decrypted using a bulk protection key, e.g., a symmetric decryption key. For example, sent data may be encrypted using a bulk protection key, e.g., a symmetric decryption key.

Cryptographic protection may be integrity protection. For example, received data may be verified using a bulk protection key, e.g., a symmetric verification key; for example, an authentication token associated with the received data, e.g., received as part or in conjunction with the received data, may be verified with the bulk protection key. For example, sent data may be provided with an authentication token, generated with the bulk protection key. Not all of the above four functions need to be present, e.g., only one or two, or some, etc. For example, in an embodiment confidentiality protection is not used, but authentication is used. For example, in an embodiment integrity protection is not used, but confidentiality protection is used. The above four functions may each use a different key, or some or all may use the same key. For performance a symmetric key is preferred for each of these, but each of these may be done with an asymmetric key as well. For example, asymmetric encryption/description, signature generation/verification, etc.

For example, on the receiving side, cryptographic protection of bulk data may include the decryption of data and the verification of an authentication token. For example, the protection may comprise an authenticated encryption (AE) and authenticated encryption with associated data (AEAD), e.g., forms of encryption which simultaneously assure the confidentiality and authenticity of data. For example, an embodiment may implement a cipher suite such as TLS <=1.2 which supports an authentication-only mode.

Other cryptographic protection may be included as desired. For example, replay protection may be added, e.g., ensuring the freshness of sent and/or received responses. In an embodiment, the bulk protection is exclusively performed in the host system 210 execution environment.

Resumption Protocol

The session handling system 220 is configured to obtain a cryptographic response from the resumption key during the resumption protocol. The cryptographic response is sent to the second network device as part of the resumption protocol to re-establish a secure session between the first network device 200 and the second network device. The session handling system 220 obtains from the resumption protocol a second bulk cryptographic protection key. The second bulk cryptographic protection key is forwarded to the host system 210 for use in protection of bulk data. Typically, the first and second bulk protection keys are symmetric keys; though this is not necessary.

During the resumption protocol the resumption key may be processed, e.g., to obtain a further key. For example, a premaster secret or a master secret may be processed during the resumption protocol to obtain a further key, which may then be used perform a cryptographic operation. Part of the processing in the resumption protocol may be precomputed.

In an embodiment, session handling system 220 obtains from the resumption protocol a new key_block or new traffic keys that comprises multiple keys. The keys update the existing keys. For example, the first bulk protection key may be part of a first multiple of protection keys. The resumption protocol may provide a second multiple of protection keys.

The second bulk protection key may be used by the host system for bulk protection, e.g., as the first bulk protection key, e.g., confidentiality or integrity protection.

Communication

In an embodiment, protocol communication is portioned between the host system and the session handler. In an embodiment, the security system is not configured for responding to or generating protocol messages. If a response from the security system is needed, the session handler can call the interface to the security system.

The host system and session handler can work together in various ways. In an embodiment, for example, host system 210 and session handling system 220 are configured with a first communication channel 221.

For example, host system 210 and session handling system 220 may be configured with a control mechanism to indicate control of the secure cryptographically protected communication 211. The control mechanism indicating control for the host system 210 during bulk protection. The control mechanism changing control from the host system 210 to the session handling system 220 for the handshake protocol and for the resumption protocol.

With the control mechanism it is clear to host system 210 and session handler 220, which one of them is responsible for the communication. The control mechanism may comprise a second communication channel to hand over a state of the secure cryptographically protected communication 211 between the host system 210 and the session handling system 220. For example, if the host system needs to generate messages that it cannot, because it does not have access to the required keys to do so, it may send a message over the second communication channel 222 to hand over control. The hand over may include any state needed to generate new messages.

For example, communication between the first network device 200 and the second network device may arrive in the host system 210 and is forwarded to the session handling system 220 over first communication channel 221 during the handshake protocol and during the resumption protocol.

For example, if messages arrive while control is at the session handler, the communication may be forwarded.

The host system may also or instead by configured to forward received communication to the session handler depending on a communication type associated with the received communication, e.g., embedded in it.

In an embodiment, received communication may be encrypted even if it is not bulk data. In particular, any indication as to the type of communication may be encrypted, e.g., the communication type may be encrypted. In an embodiment, the host system is configured to decrypt at least the communication type before forwarding the communication to the session handler depending on the communication type. For example, in an embodiment, the host system is configured to decrypt all incoming communication, and to forward if the communication needs further handling by the session handler.

For example, an embodiment using DTLS use a Content-Type field, indicating the record type. The ContentType field may be used to decide if a DTLS record will be handled by the host system or by the session handling system. This corresponds to the used subprotocol of TLS (e.g.: application_data, handshake, alert, change_cipher_spec, etc.) The host system may be configured to pass through all records, which are not application_data, to the session handling system. This may be extended with encryption of the ContentType field, e.g., as part of the Record Payload Protection feature. If ContentType field encryption is used, the host system may be configured to decrypt it before processing the record itself, or forwarding to the session handler.

Instead of letting the host system simply forward (e.g., unmodified) all TLS (or DTLS) records which are not application_data to the session handling system, it is possible as a variant to let the host system always handle the decryption/authentication check for all kinds of protected records—not only for application_data records but also other types of TLS records after the initial handshake. This is possible since the host system and the session handling system can split their responsibilities as desired, e.g., using the control channel 222.

Below several further optional refinements, details, and embodiments are illustrated.

Example Embodiment 1

In the following, an overview of the setup and its workings will be given. The device comprises a TLS/DTLS Session Handling System. Note that the described method can be applied independently of the Host System's role as a client or server. For each active TLS/DTLS session with an external TLS/DTLS endpoint, two logical communication channels may be established between the Host System and the TLS/DTLS Session Handling System. The session channel may be used in order to transparently forward all TLS/DTLS protocol record types at times when the TLS/DTLS Session Handling System is in active control. The control channel may be used to transfer state and control between the Host System and the TLS/DTLS Session Handling System (e.g., at each point in time and depending on the currently processed subprotocol, only one of these systems may be the active TLS/DTLS protocol endpoint). During a full handshake, the TLS/DTLS Session Handling System interacts with the Security system in the scope of Endpoint Authentication.

For example, the host system may be configured for TCP/IP based connectivity with external TLS/DTLS endpoints. The host system is configured for bulk protection, in particular, bulk encryption (e.g., handling of application_data record type). The host system has access to symmetric keys for encryption & authentication (key_block) but not to other ephemeral key material. The Session channel is arranged to transparently relay all other record protocol types to the TLS/DTLS Session Handling System.

The session handling system is configured to manage handshake and TLS/DTLS session state and all ephemeral key material, e.g., handshake, alert & change_cipher_spec records. The session handling system interacts with the Security system in the scope of endpoint authentication during a full handshake Step 1. A new TCP/IP connection for TLS (or DTLS in case of UDP) is initiated between an external TLS/DTLS endpoint and the Host System. In order to initiate the TLS/DTLS handshake, the Host System provides a preinitialized TLS/DTLS state (e.g., in order to signal if TLS or DTLS is requested) and then hands over control to the TLS/DTLS Session Handling System. After giving up active control, the Host System then transparently forwards all further records between the TLS/DTLS Session Handling System and the external TLS/DTLS endpoint.

Step 2. In the scope of endpoint authentication during an initial full handshake, the TLS/DTLS Session Handling System interacts with the Security system (e.g., in order to obtain the ECDSA signature which is required for endpoint authentication via long-term keys). For server-side TLS/DTLS endpoints, in case an abbreviated resumption handshake is requested and acceptable, involvement of the Security system is not required. The handshake between the TLS/DTLS Session Handling System and the external TLS/DTLS endpoint establishes all required state and ephemeral key material (e.g., key material for resumption, key_block for bulk encryption, a STEK for encrypting session tickets in case this resumption mechanism is used at a server-side endpoint, etc.).

Step 3. After the handshake is completed, the TLS/DTLS Session Handling System provides all required state for handling application_data records (e.g., key_block but not other ephemeral key material) to the Host System via the control channel and hands over control. The Host System takes over control until a subprotocol different from the application_data record type is encountered which then would trigger another transfer of state and control to the TLS/DTLS Session Handling System. The TLS/DTLS Session Handling System would then be the active TLS/DTLS endpoint until the corresponding subprotocol event (e.g., rekeying, renegotiation, resumption, termination, etc.) has been completed.

Step 4. The Host System which takes over again as the active TLS/DTLS endpoint in order to process bulk encryption (e.g., application_data records). Active involvement of the TLS/DTLS Session Handling System is not required until a record type other than application_data is encountered.

Example Embodiment 2

In this exemplifying embodiment, the first network device is equipped with a separation mechanism, e.g., a Trusted Computing Base (TCB), e.g., a hypervisor and a security system. The security system is preferably arranged to provide hardware based shielding of a long-term secret, but this is not necessary. We will assume the security system is a hardware based module storing a long-term secret, or multiple long-term secrets, accessible only through a cryptographic interface. It should be noted that hardware module is not necessary for the security system.

Without hardware based protection, the setup may not protect for local, physical attacks against the device. In particular not since the long-term private key material would then not be protected by any hardware means when the device is powered off. However, separating the long term secret from the host system still provides advantages in cases where only attacks from the network are considered to be relevant.

The embodiment is assumed to have TCP/IP based connectivity and TLS. A variant embodiment may use UDP and DTLS instead. Yet a further variant, uses QUIC from RFC9000. QUIC is also based on UDP.

Multiple execution environments are created, e.g., using the separation mechanism such as a hypervisor. A first execution environment called the 'host execution environment'. It runs a software package called the 'host system'. The first execution environment may also run an application, e.g., a user application. A second execution environment called the 'session handling execution environment'. It runs a software package called the 'session handling system'.

For example, a user application may use a TLS library in the host execution environment, which basically means the library code runs in the same process context with respect to TLS, only the application_data subprotocol will be handled there.

In the simplest case, e.g., separation of processes only by OS kernel like, the session handling system may just be another process, separated by the OS kernel's TCB which is then dedicated for the task of TLS session handling, e.g., handling handshake, alert & change_cipher_spec subprotocols and interacting with the security system. As an optional variant which additionally uses the stronger separation from a hypervisor, host system and session handling system would be the separate environments which are located in different VMs separated by a hypervisor. As another alternative, the session handling system might potentially also be implemented as some kind of bare-metal application, e.g., a unikernel which leaves out the POSIX OS kernel, etc. Another alternative deployment scenario would move the session handling system into a Trusted Execution Environment (TEE).

One or more communication channels are created between the host system and the session handling system called. In an embodiment, there are at least two communication channels: the session channel and the control channel In an embodiment, only one session channel and one control channel is used. Even in this case, multiple TLS sessions can be supported, e.g., by multiplexing the communication channel or channels. In an embodiment, multiple communication channels are created making it easier to handle multiple TLS sessions.

In an embodiment, each application which uses TLS would typically correspond to a dedicated 'host system', and typically would be run as a dedicated application process—e.g., the device may have multiple host systems in the sense of multiple TLS-enabled processes/applications. Each of the host systems may have its own execution environment. Each host system could then be connected to one single, shared session handling system via session and control channel (s). Alternatively, multiple, dedicated session handling system may be configured, e.g., one for each host system.

Multiple TLS sessions handled by the same application (e.g., in the same host system environment) might be handled via a single pair of session and control channel (e.g., by making use of multiplexing, or, alternatively, by establishing dedicated session and control channels for each TLS session).

Initial Handshake—Non-Resumption Case

Application: The user application signals the host system through an API that it wants to initiate a cryptographically protected end-to-end secure tunnel (a secure session for short) with a second network device using TLS. Instead of the application initiating the secure session, the secure session may be initiated by the second network device.

Typically, the user application and host system effectively belong to the same application process, e.g., the TLS handling part would be typically done by a loaded TLS library.

Host System:
a. Hands over control through the control channel. The host system may first pre-initialize a handshake message and forward it to the session handling system over the control channel, e.g., in conjunction with handing over control.
b. While control is with the session handling system, the host system transparently forwards all messages from the session handling system to the second network device, and vice versa.

For example, pre-initialization at the host system may be used at least in some cases. For example, when the application functions as a client, the host system may signal to the session handling system if a TLS or a DTLS session shall be initiated, which SNI shall be initialized, may be also which TLS protocol versions, cipher suites, etc. Such parameters of the communication may be transferred in a structured manner over the control channel instead of over the session channel. Both options are possible.

Session Handling System:
c. Finish the handshake protocol, which includes
 i. Further filling in the pre-initialized a handshake message (if used)
 ii. Interacting with the Security system (e.g., in order to obtain a signature which is required for endpoint authentication via long-term keys).
 iii. Obtain from handshake protocol:
  1. state
  2. ephemeral key material for bulk encryption: key_block
   a. An example of a key_block is given in TLS 1.2 RFC 5246. An example of a key_block are the traffic keys in TLS 1.3 RFC 8446.
  3. ephemeral key material for resumption.
d. Transfers control to host system over the control channel and forwards the key_block to the host system over the control channel.

In general, ephemeral key material is key material with a limited lifetime (e.g., short-term in contrast to long-term keys). The initial handshake using the long-term keys e.g., involving DHE or ECDHE, etc., may create a so-called premaster secret. The premaster secret is kept protected inside the session handling system since it can be cryptographically combined with publicly visible information from the previous handshake in order to compute the master secret. Consequently, the master secret is derived from the premaster secret and this may be used for resumption purposes in TLS <=1.2. In TLS 1.3 this resumption key is called a Pre-Shared Key and the protocol-specifics are also different.

Note that the key_block (called traffic keys in TLS 1.3/RFC8446) is preferably the only kind of ephemeral key material which the session handling system shares with the host system. Ephemeral key material for resumption may include, e.g., the master secret, the pre-master secret.

The Session Ticket Encryption Key (STEK) is another example of ephemeral key material which is used in the scope of session ticket based resumption and which should only be kept inside the session handling system and not be made available to the host system. A STEK is used in the session ticket mechanism (RFC5077). The STEK is a key with a limited lifetime of e.g., 1 hour. It is used in order to encrypt session tickets which are then sent to the clients in order to enable them to resume sessions.

Bulk Protection

Host system: Receive TLS message of type application_data with encrypted data. Perform bulk decryption using the key_block received from the session handler. Send decrypted data to application
 e. An example of application_data is given in TLS 1.2 RFC5246 and TLS 1.3 RFC8446

Host system: Receive unencrypted data from application. Perform bulk encryption using the key_block in the secure session. Send encrypted data in application_data message to second network device.

This example considers encryption as an example of cryptographic protection of bulk traffic. However, other examples are possible. For example, (depending on the used cipher suite) a key_block may comprise multiple symmetric keys, e.g., 2 for encryption and 2 for authentication, e.g., for AES-CBC there may be 4 keys, 2 for authentication and 2 for encryption—used by the client and server endpoints for communication in one direction, respectively. For AEAD ciphers, yet different options exist as AEAD achieves encryption & authentication with a single operation . . . ; for TLS <=1.2 authentication-only cipher suites are also possible, etc.

Handling Non-Bulk Encryption Messages

Host system: Receive a message of a type in the group {handshake, alert, change_cipher_spec}. Forward the message to the session handler over the session channel, and transfer control over the control channel Session Handling System:
 f. Create a response to the message of non application_data type and send to second network device (though Host system using the session channel.)
 g. Return control to host system over the control channel Handshake—Resumption Case Application/Host system: initiate a re-established session with the second network device as above.

Host system: Hands over control through the control channel. The host system may pre-initialize a handshake message and forward it to the session handling system over the control channel. Other options, as described above may also be used here.

Session handling system: Finish the handshake protocol, now using the resumption key material instead of the long-term secret. When done, control is passed back to host system.

Figure 3:
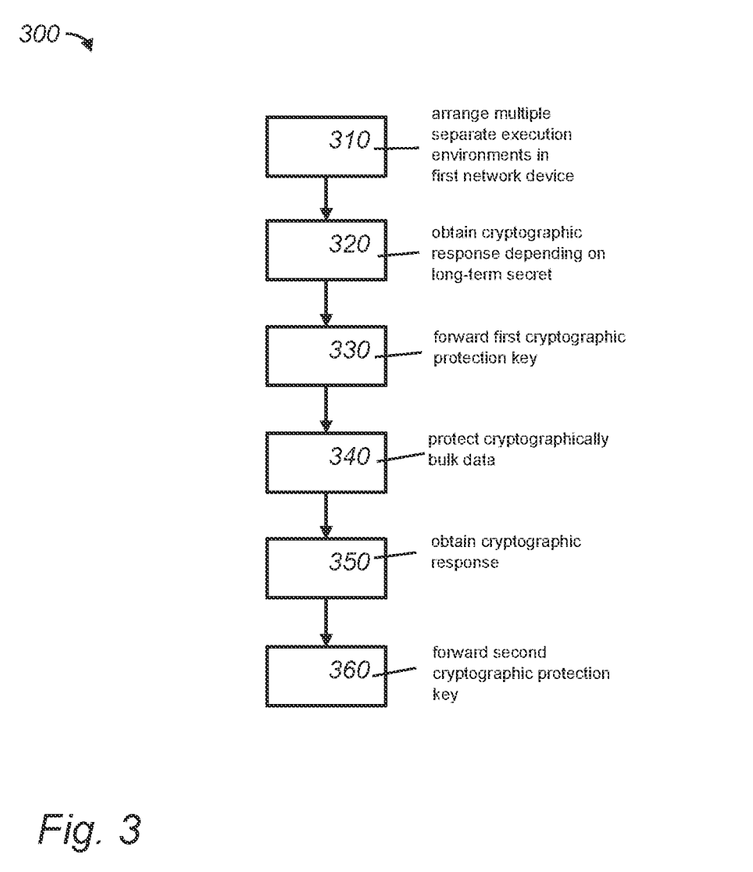
FIG. 3 schematically shows an example of an embodiment of a method for cryptographically protected communication, according to the present invention.

FIG. 3 schematically shows an example of an embodiment of a method 300 for cryptographically protected communication between a first network device and a second network device. The cryptographically protected communication comprises at least a handshake protocol, a cryptographic protection of bulk data protocol, and a resumption protocol. The method comprises arranging (310) multiple separate execution environments in the first network device, the multiple separate execution environments including a host system and a session handling system, wherein during the handshake protocol, obtaining (320) by the session handling system a cryptographic response depending on the long-term secret, the cryptographic response being sent to the second network device as part of the handshake protocol to establish a secure session between the first network device and the second network device, the session handling system obtaining from the handshake protocol a first bulk cryptographic protection key and a resumption key, forwarding (330) the first cryptographic protection key to the host system, during the cryptographic protection of bulk data protocol, protecting (340) by the host system, cryptographically bulk data sent to and/or received from the second network device in the secure session with a bulk cryptographic protection key received from the session handling system during the resumption protocol, obtaining (350), by the session handling system, a cryptographic response from the resumption key, the cryptographic response being sent to the second network device as part of the resumption protocol to re-establish a secure session between the first network device and the second network device, the session handling system obtaining from the resumption protocol a second bulk cryptographic protection key, forwarding (360) the second cryptographic protection key to the host system for use in bulk cryptographic protection.

In an embodiment, the first network device comprises a security system, the security system being configured to store a long-term secret, the method comprises obtaining, by the session handling system, the cryptographic response from the security system.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 300. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 4A:
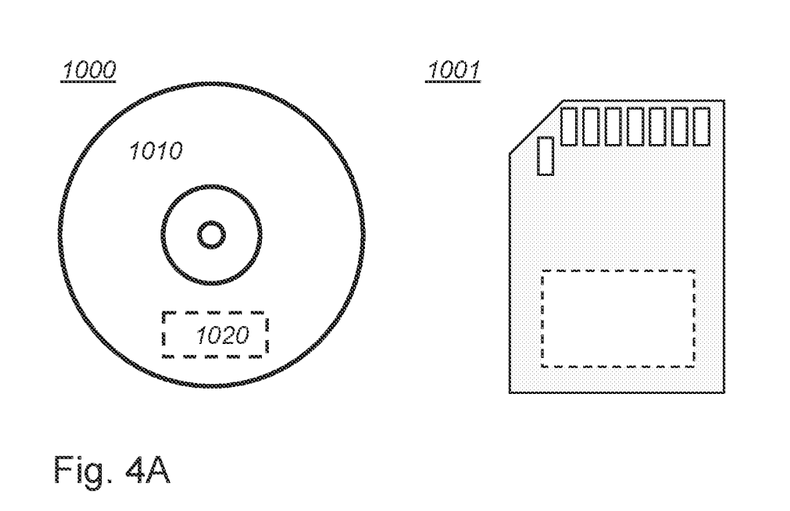
FIG. 4A schematically shows a computer readable medium having a writable part comprising a computer program according to an example embodiment of the present invention.

FIG. 4a shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform an embodiment of communication method according to an embodiment. The computer program 1020 may be embodied on the computer readable medium 1000 as physical marks or by magnetization of the computer readable medium 1000. However, any other suitable embodiment is possible as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said communication method.

Figure 4B:
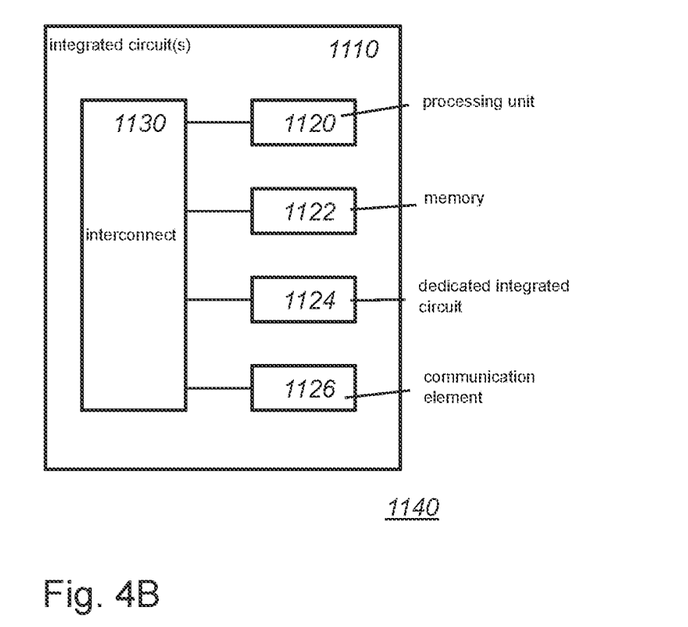
FIG. 4B schematically shows a representation of a processor system according to an example embodiment of the present invention.

FIG. 4b shows in a schematic representation of a processor system 1140 according to an embodiment of the first network device. The processor system comprises one or more integrated circuits 1110. The architecture of the one or more integrated circuits 1110 is schematically shown in FIG. 4b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus.

The processor system 1110 may be arranged for contact and/or contact-less communication, using an antenna and/or connectors, respectively.

For example, in an embodiment, processor system 1140, e.g., the first network device may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the presently disclosed subject matter, and that those skilled in the art will be able to design many alternative embodiments.

Use of the verb 'comprise' and its conjugations does not exclude the presence of elements or steps other than those stated. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In a device described as including several parts, several of these parts may be embodied by one and the same item of hardware. The mere fact that certain measures are described in mutually different embodiments does not indicate that a combination of these measures cannot be used to advantage.

What is claimed is:

1. A first network device configured for cryptographically protected communication with a second network device, the cryptographically protected communication including at least a handshake protocol, a cryptographic protection of bulk data protocol, and a resumption protocol, the first network device being configured to arrange multiple separate execution environments in the first network device, the multiple separate execution environments including a host system execution environment executing a host system and a session handling system execution environment executing a session handling system; wherein:

during the handshake protocol, the session handling system is configured to obtain a cryptographic response depending on a long-term secret, the cryptographic response being sent to the second network device as part of the handshake protocol to establish a secure session between the first network device and the second network device, the session handling system obtaining from the handshake protocol a first bulk cryptographic protection key and a resumption key, the first cryptographic protection key being forwarded to the host system, during the cryptographic protection of bulk data protocol, the host system is configured to cryptographically protect bulk data sent to or received from the second network device in the secure session with a bulk cryptographic protection key received from the session handling system, during the resumption protocol, the session handling system is configured to obtain a cryptographic response from the resumption key, the cryptographic response being sent to the second network device as part of the resumption protocol to re-establish a secure session between the first network device and the second network device, the session handling system obtaining from the resumption protocol a second bulk cryptographic protection key, the second cryptographic protection key being forwarded to the host system for use in bulk cryptographic protection.

2. The first network device as recited in claim 1, wherein the first network device comprises a security system, the security system being configured to store the long-term secret, and the session handling system is configured to obtain the cryptographic response from the security system.

3. The first network device as recited in claim 1, wherein the cryptographic protection of bulk data protocol includes bulk encryption, and/or bulk decryption, and/or bulk authentication.

4. The first network device as recited in claim 1, wherein the bulk cryptographic protection is exclusively performed in the host system execution environment.

5. The first network device as recited in claim 1, wherein each execution environment does not have access to data and/or software in another execution environment in the first network device, nor to data and/or software in the security system.

6. The first network device as recited in claim 1, wherein:
neither the host system execution environment nor the session handling system execution environment have access to the long-term secret, and
the host system execution environment does not have access to the resumption key.

7. The first network device as recited in claim 1, wherein the host system runs a cryptographic application to cryptographically protect data using the bulk cryptographic protection key, the cryptographic application being configured to protect data sent to and/or received from the second network device.

8. The first network device as recited in claim 1, wherein during the handshake protocol, the session handling system is configured to obtain from the handshake protocol a master secret shared with the second network device, the first bulk cryptographic protection key and the resumption key being derived from the master secret key, the host system execution environment not having access to the master secret.

9. The first network device as recited in claim 1, wherein the bulk cryptographic protection key and the resumption key are short-term keys.

10. The first network device as recited in claim 1, wherein the first network device is configured for TLS according to RFC8446, wherein the host system is configured to process records of type application_data protocol but not operations of other types including handshake, alert, and change_cipher_spec type, and the session handling system is configured to execute operations of the other types.

11. The first network device as recited in claim 1, wherein the host system and the session handling system are configured with a first communication channel, wherein communication between the first network device and the second network device arrives in the host system and is forwarded to the session handling system over the first communication channel during the handshake protocol and during the resumption protocol.

12. The first network device as recited in claim 1, wherein the host system and the session handling system are configured with a control mechanism to indicate control of the secure cryptographically protected communication, the control mechanism indicating control for the host system during bulk cryptographic protection, the control mechanism changing control from the host system to the session handling system for the handshake protocol and for the resumption protocol.

13. The first network device as recited in claim 12, wherein the control mechanism includes a second communication channel to hand over a state of the secure cryptographically protected communication between the host system and the session handling system.

14. The first network device as recited in claim 1, wherein the communication includes a communication type, the host system being configured to forward the communication to the session handler depending on the communication type.

15. The first network device as recited in claim 14, wherein the communication type is encrypted, the host system being configured to decrypt at least the communication type before forwarding the communication to the session handler depending on the communication type.

16. The first network device as recited in claim 1, wherein the host system is configured to provide a partially initialized state to the session handling system for completion by the session handling system during the handshake protocol and/or the resumption protocol.

17. The first network device as recited in claim 1, wherein:
the first network device is a consumer device or an IoT client, and/or
the first network device is a server device or an IoT backend device.

18. A method for cryptographically protected communication between a first network device and a second network device, the cryptographically protected communication comprising at least a handshake protocol, a cryptographic protection of bulk data protocol, and a resumption protocol, the method comprising the following steps:
arranging multiple separate execution environments in the first network device, the multiple separate execution environments including a host system execution environment executing a host system and a session handling system execution environment executing a session handling system;
during the handshake protocol, obtaining by the session handling system a cryptographic response depending on the long-term secret, the cryptographic response being sent to the second network device as part of the handshake protocol to establish a secure session between the first network device and the second network device, the session handling system obtaining from the handshake protocol a first bulk cryptographic protection key and a resumption key;
forwarding the first cryptographic protection key to the host system;
during the cryptographic protection of bulk data protocol, protecting by the host system, cryptographically bulk data sent to and/or received from the second network device in the secure session with a bulk cryptographic protection key received from the session handling system;
during the resumption protocol, obtaining, by the session handling system, a cryptographic response from the resumption key, the cryptographic response being sent to the second network device as part of the resumption protocol to re-establish a secure session between the first network device and the second network device, the session handling system obtaining from the resumption protocol a second bulk cryptographic protection key;
forwarding the second cryptographic protection key to the host system for use in bulk cryptographic protection.

19. A non-transitory computer readable medium on which are stored data representing instructions for cryptographically protected communication between a first network device and a second network device, the cryptographically protected communication comprising at least a handshake protocol, a cryptographic protection of bulk data protocol, and a resumption protocol, the instructions, when executed by a processor system, causing the processor system to perform the following steps:
arranging multiple separate execution environments in the first network device, the multiple separate execution environments including a host system execution environment executing a host system and a session handling system execution environment executing a session handling system;
during the handshake protocol, obtaining by the session handling system a cryptographic response depending on the long-term secret, the cryptographic response being sent to the second network device as part of the handshake protocol to establish a secure session between the first network device and the second network device, the session handling system obtaining from the handshake protocol a first bulk cryptographic protection key and a resumption key;
forwarding the first cryptographic protection key to the host system;
during the cryptographic protection of bulk data protocol, protecting by the host system, cryptographically bulk data sent to and/or received from the second network device in the secure session with a bulk cryptographic protection key received from the session handling system;
during the resumption protocol, obtaining, by the session handling system, a cryptographic response from the resumption key, the cryptographic response being sent to the second network device as part of the resumption protocol to re-establish a secure session between the first network device and the second network device, the session handling system obtaining from the resumption protocol a second bulk cryptographic protection key;
forwarding the second cryptographic protection key to the host system for use in bulk cryptographic protection.

* * * * *